United States Patent [19]
Schmidt et al.

[11] Patent Number: 5,934,767
[45] Date of Patent: Aug. 10, 1999

[54] ANTI-BLOCKING HYDRAULIC BRAKE SYSTEM

[75] Inventors: Guenther Schmidt, Tauberbischofsheim; Hermann Winner, Karlsruhe; Alain Gaillard, Karlsruhe, all of Germany

[73] Assignee: Robert Bosch GmbH, Stuttgart, Germany

[21] Appl. No.: 08/894,617

[22] PCT Filed: Jan. 31, 1996

[86] PCT No.: PCT/DE96/01417

§ 371 Date: Aug. 22, 1997

§ 102(e) Date: Aug. 22, 1997

[87] PCT Pub. No.: WO97/23372

PCT Pub. Date: Jul. 3, 1997

[30] Foreign Application Priority Data

Dec. 22, 1995 [DE] Germany ............................ 195 48 207

[51] Int. Cl.⁶ ........................................................ B60T 8/36
[52] U.S. Cl. .................................... 303/119.2; 303/116.2; 303/155
[58] Field of Search ............................. 303/119.2, 119.1, 303/116.1, 116.2, DIG. 1–DIG. 4, 155; 137/596.16, 596.17

[56] References Cited

U.S. PATENT DOCUMENTS

| | | | |
|---|---|---|---|
| 3,877,760 | 4/1975 | Cole et al. | 303/119.2 |
| 4,526,203 | 7/1985 | Leiber | 303/119.2 X |
| 5,609,401 | 3/1997 | Johnston et al. | 303/116.2 X |

*Primary Examiner*—Peter M. Poon
*Attorney, Agent, or Firm*—Edwin E. Greigg; Ronald E. Greigg

[57] ABSTRACT

An external energy source of a hydraulic motor vehicle power brake system, which has first and second valves that can be electrically controlled to adjust wheel brake pressures for wheel brakes, must be protected from being overloaded. To avoid the necessity for a safety valve, which has been used up to this point for protecting the external energy source, it is proposed that the first valve be embodied as a seat valve having a valve seat connected to the external energy source by means of an inlet opening disposed upstream, having a valve closing body associated with the valve seat, and having a closing spring that presses the valve closing body against the valve seat, which spring is dimensioned as a safety valve spring in a fashion according to the invention. In a reasonably priced manner, the first valve is used as a safety valve that protects the external energy source and on the other hand, for braking procedures, is used as a valve for adjusting wheel brake pressures.

12 Claims, 4 Drawing Sheets

ANTI-BLOCKING HYDRAULIC BRAKE SYSTEM

PRIOR ART

The invention is based on a hydraulic motor vehicle power brake system with at least one valve that can be electrically controlled.

The document U.S. Pat. No. 3,802,745 has disclosed a hydraulic motor vehicle power brake system having a reservoir, a pump, a pump pressure regulating valve, and at least one external energy reservoir that can be filled by the pump. The reservoir is embodied as a hydraulic accumulator equipped with a dividing membrane and is provided with a buffer gas filling, and a valve device between the external energy reservoir valve device which valve device can be electrically controlled and is for connecting at least one wheel brake to the external energy reservoir. A wheel brake pressure sensor is associated with the at least one wheel brake, and a brake pedal have a potentiometer as a set-point transmitter for a wheel brake pressure in which the potentiometer can be adjusted by means of the brake pedal. A control device is connected to the set-point transmitter and the wheel brake pressure sensor and is equipped to control the valve device in such a way that by connecting the at least one wheel brake to the external energy source, it is possible to increase the wheel brake pressure until the set point is attained and by connecting the wheel brake to the reservoir, it is possible to reduce the wheel brake pressure when the brake pedal is released. This valve device, which is of a type that is known per se and is therefore not described, has three connections. For example, it is possible to provide a number of these valve devices so that for example, each wheel brake of each individual wheel of the vehicle has its own valve device. By disposing wheel rotation sensors and modifying the control device, it is possible to adjust brake pressures toward a set-point predetermined by the brake pedal so that a locking of vehicle wheels is prevented. The technical expenditure for the pump pressure regulator valve, which conducts excess supplied pressure fluid to the reservoir when the pump is driven, the hydraulic accumulator is fully charged, and the brake pedal is not being actuated, can be seen as disadvantageous.

A hydraulic motor vehicle power brake system disclosed by DE 19 61 039 A1 differs from the hydraulic motor vehicle power brake system according to U.S. Pat. No. 3,802,745, which is mentioned above, by the elimination of a pump pressure limiting valve and the installation in its place, of a pressure switch for turning off an electromotor, which drives the pump, when the external energy reservoir is sufficiently charged. The disposition of the pressure switch and the electromotor has on the one hand the advantage that the pump only operates until the external energy reservoir is sufficiently filled. On the other hand, though, the disposition of this kind of pressure switch has the disadvantage that when a possibly inevitable welding of contact elements occurs, the electromotor can no longer be switched off, which results in the overloading or complete destruction of the electromotor, the pump, or other components of the motor vehicle power brake system. Aside from the use of valves with three connections between the external energy source, a wheel brake cylinder, and the reservoir, DE 19 61 039 A1 also discloses the disposition of an electromagnetically controllable directional control valve between the external energy source and the wheel brake cylinder, which valve is provided with two connections and can be adjusted for two positions, and also discloses the disposition of a second 2-connection-2-position directional control valve between this wheel brake cylinder and the reservoir. Both 2-connection valves are equipped with closing springs and are closed in their normal positions.

In a vehicular brake system that can be operated with external energy, DE 40 29 793 A1 has disclosed the embodiment of necessary 2/2-way valves, which are designated for adjusting wheel brake pressures with the aid of wheel brake pressure sensors, as seat valves in order to prevent leakage flows. This increases the operational safety of the motor vehicle power brake system particularly when in the event of a failure of the external energy, braking function has to be produced through the use of a master cylinder that can be actuated by means of a pedal.

ADVANTAGES OF THE INVENTION

The hydraulic motor vehicle power brake system according to the invention has the advantage that installation of a pump pressure regulating valve, as is taught by U.S. Pat. No. 3,802,745, can be eliminated because the spring embodied according to the invention, together with the closing member and the valve seat, which is connected to the external energy source and is part of the valve used for braking, assumes the function of a pump pressure regulating valve, at least when the brake pedal is not actuated. If in spite of, a pressure switch according to DE 19 61 039 A1 that is associated with an electromotor that drives the pump, then the electromotor and the pump of the power brake system are spared between braking procedures. This also saves energy.

Advantageous modifications and improvements of the hydraulic motor vehicle power brake system are possible by means of the measures taken herein.

The features set forth herein produce the advantage that a wheel brake pressure can at least be reduced by at least partially permitting the brake pedal to move back in the direction of its initial position.

The features set forth herein produce the advantage that due to an adjustment of the pressing of the second closing body against the valve seat of the second valve body because of the controlled or regulated adjustment of the second excitation current, it is possible for pressure fluid to be discharged to the reservoir while maintaining the first excitation current during a braking procedure. The external energy source delivers excess pressure fluid, which results in the fluid flowing through the first valve seat. In so doing, in a manner that supports the invention, fluid can flow through the valve seat of the second valve so that the external energy source can be protected against overloading.

The features set forth herein produce the advantage that for example a number of vehicle wheels can be braked independently of one another so that for example, as has already been taught by U.S. Pat. No. 3,802,745, with the disposition of wheel rotation sensors and a modification the control device, the danger of wheel locking in one or several vehicle wheels can be prevented individually by means of operationally dependent automatic reduction of wheel brake pressure. Furthermore, based on the generally known prior art in traction control technology, there is the possibility of using the vehicle brake system for compensation for excess drive torque in vehicle wheels by controlling the first and second valves.

The features set forth herein produce the advantage that on the one hand, when the wheel brake pressure is increased and/or kept constant, a preceding and disadvantageous pressure fluid discharge to the reservoir by means of the second valve is prevented and that on the other hand, as a result of a total pressure difference between the external energy source or its pump and the reservoir, which pressure difference can be jointly adjusted by means of the first valve and the second valve, the external energy source or its pump or other elements can be protected against overloading. According to the modulation of the second excitation current controller or the regulator that acts on the second excitation current controller, the pressure prevailing in the external energy source is then only a few bar higher than when the brake pedal is released and the second valve is therefore opened, wherein according to the invention, the first valve fulfills the function of a pump pressure regulating valve. Other features disclose an advantageous embodiment of the control device.

BRIEF DESCRIPTION OF THE DRAWINGS

Two exemplary embodiments of the hydraulic motor vehicle power brake system according to the invention are depicted in the drawings and explained in detail below.

DESCRIPTION OF THE EXEMPLARY EMBODIMENTS

Figure 1:
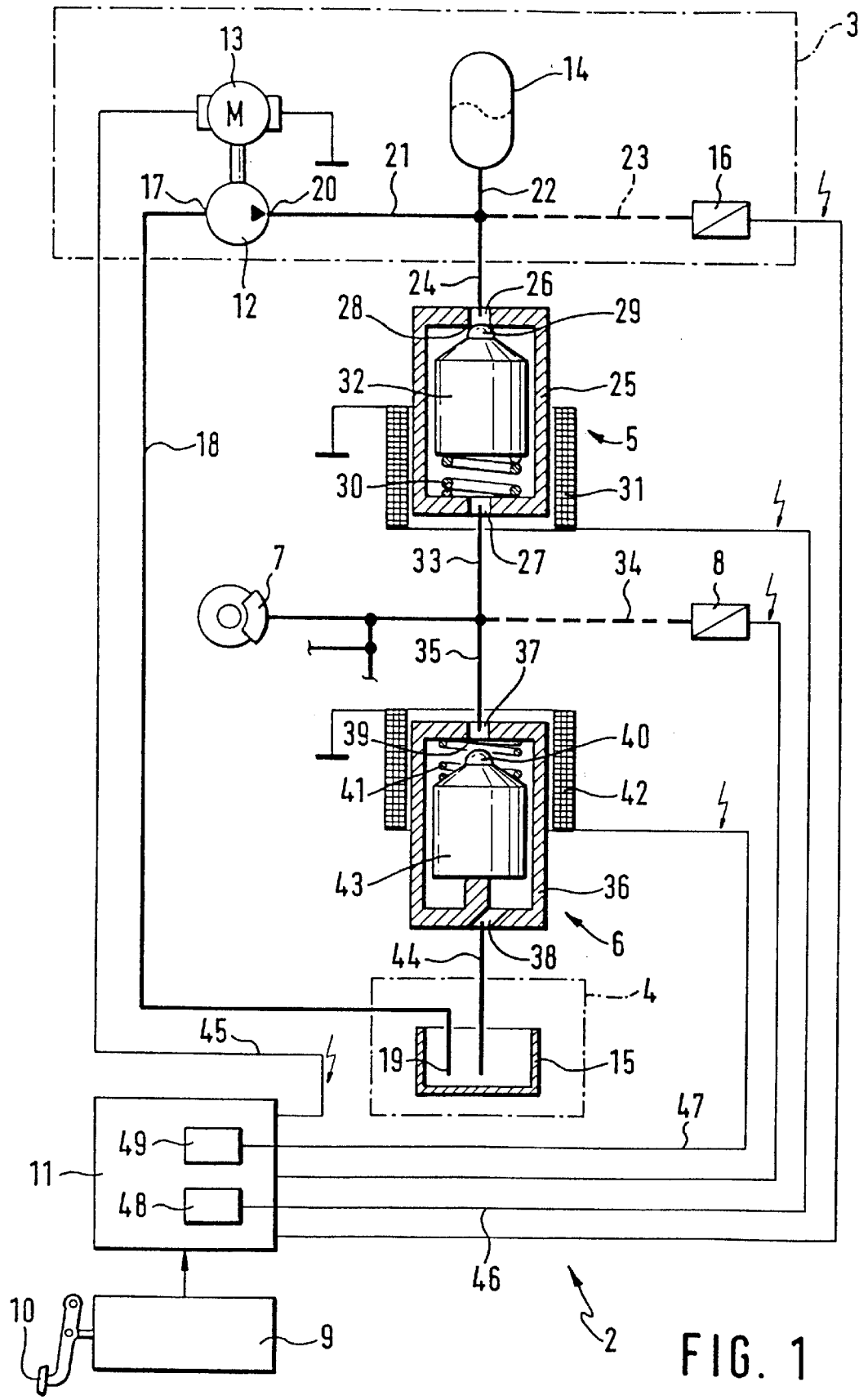
FIG. 1 shows the hydraulic circuit of a first exemplary embodiment of the hydraulic motor vehicle power brake system.

The first exemplary embodiment of a hydraulic motor vehicle power brake system 2 according to FIG. 1 has an external energy source 3, 4, a first valve 5, a second valve 6, at least one wheel brake 7 and one wheel brake pressure sensor 8 connected between the first valve 5 and the second valve 6, a wheel brake pressure set-point transmitter 9, a brake pedal. 10 for adjusting the wheel brake pressure set-point transmitter 9, and a control device 11.

In the exemplary embodiment of FIG. 1, the external energy source 3, 4 is comprised of a pump 12, an electromotor 13 to drive the pump 12, an external energy reservoir 14 embodied as a hydraulic accumulator, a pressureless reservoir 15 for hydraulic pressure fluid, and a pump pressure sensor 16. An inlet 17 of the pump 12 is connected to an intake line 18, whose front end 19 dips into the reservoir 15. By means of pressure lines 21 and 22, an outlet 20 of the pump 12 supplies the hydraulic accumulator 14 being used to store the external energy, which accumulator can be embodied, for example, as a so-called bladder reservoir with a gas buffer. By means of another pressure line 23, the pump pressure sensor 16 can be connected to the pressure line 21 and therefore to the outlet 20 of the pump 12. Starting from the pressure line 21, a pressure line 24 leads from the external energy source 3 to the first valve 5.

The first valve 5 has a housing 25 with an inlet opening 26 and an outlet opening 27. The inlet opening 26 feeds into a valve seat 28. The valve seat 28 is associated with a closing body 29. For example, the closing body 29 is embodied as ball-shaped in a region designated for contacting the valve seat 28. The valve 5 also has a closing spring 30 that presses the closing body 29 against the valve seat 28. In a manner according to the invention, this closing spring 30 is embodied and prestressed matched to the diameter of the valve seat 28 in such a way that it assumes the function of a safety valve spring and when the pump 12 is running, limits its pressure or when the pump 12 is inactive and there is a temperature increase in the hydraulic accumulator 14, prevents a disadvantageous pressure increase. The valve 5 can be electromagnetically controlled and to this end, has at least one exciter coil 31 and one armature 32. A wheel brake line 33 leads from the outlet opening 27 of the valve 5 and leads to the at least one wheel brake 7 or it branches. The wheel brake pressure sensor 8 is connected to the wheel brake line 33 by means of a sensor line 34 and therefore communicates with the at least one wheel brake 7. Another wheel brake line 35 communicates with the at least one wheel brake 7.

The second valve 6 likewise has a housing 36, an inlet opening 37, and an outlet opening 38. The inlet opening 37 is connected to the wheel brake line 35 and therefore communicates with the at least one wheel brake 7 and the wheel brake pressure sensor 8. The inlet opening 37 feeds into a second valve seat 39. The second valve seat 39 is associated with a second closing body 40. Furthermore, the valve 6 has an opening spring 41, which is capable of opening the valve 6, but is dimensioned to be as weak as possible. In order to electromagnetically control the valve 6, it is associated with at least one excitation coil 42 and an armature 43.

So that the following function description of the hydraulic motor vehicle power brake system 2 is simple and clear, the valve seat 39 should, for example, have the same diameter as the valve seat 28 of the first valve 5 mentioned. Also, the closing body 40 of the second valve 6 should be embodied identically to the closing body 29 of the first valve 5.

A return line 44 leads from the outlet opening 38 of the second valve 6 and feeds into the reservoir 15.

Figure 3:
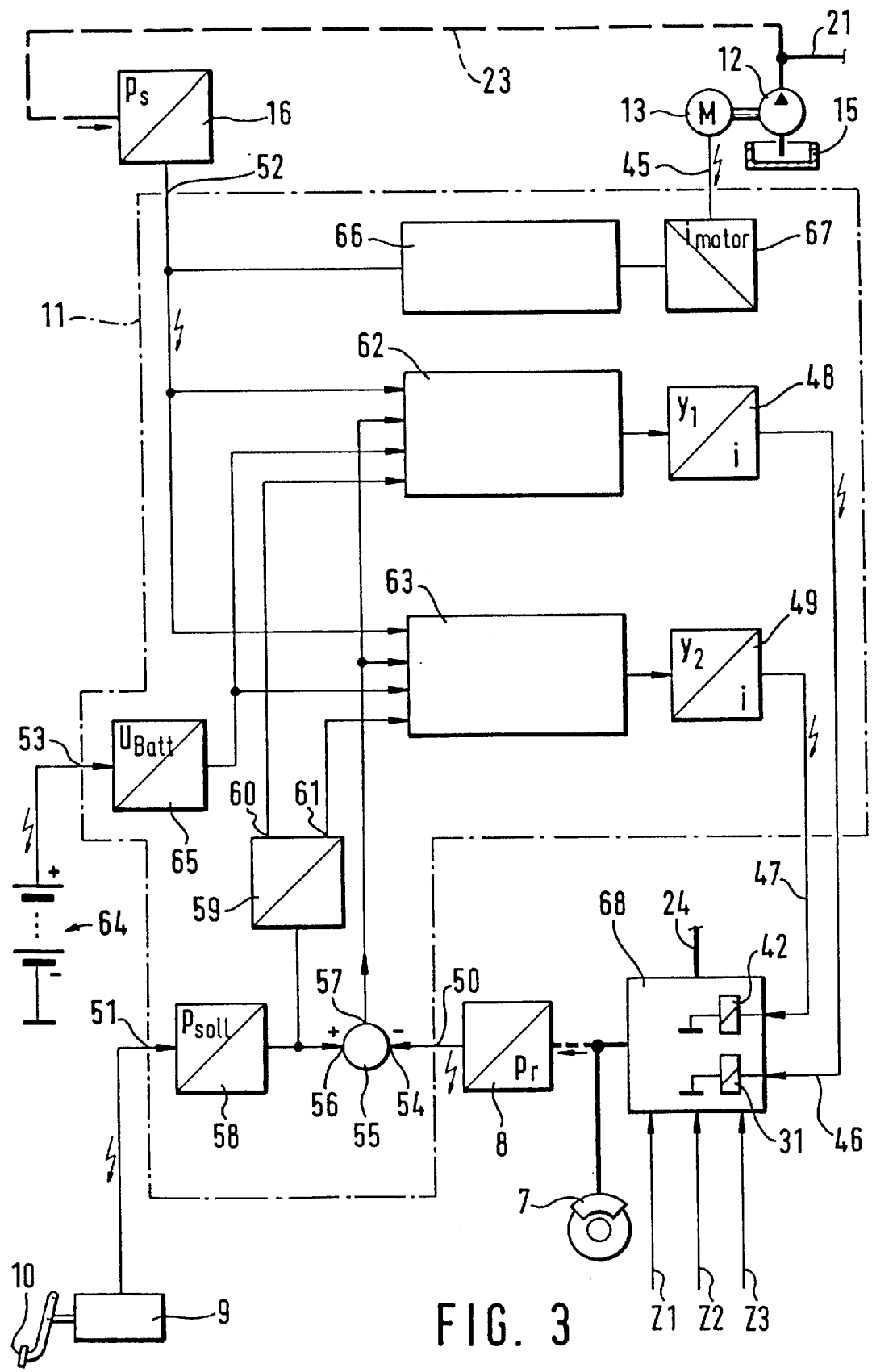
FIG. 3 shows a circuit diagram for a control device of the motor vehicle power brake system according to the invention.

The control device 11, whose structure will be explained later in conjunction with FIG. 3, is connected on the one hand to the wheel brake pressure sensor 8 and on the other hand, is connected to the wheel brake pressure set-point transmitter 9. Furthermore, the control device 11 is also connected to the pump pressure sensor 16. Electrical lines 45, 46, 47 lead from the control device 11. The line 45 leads to the electromotor 13 of the pump 12. The electrical line 46 leads to the excitation coil 31 of the first valve 5, and the electrical line 47 leads to the excitation coil 42 of the second valve 6. In anticipation of the description of FIG. 3, the control device 11 has a first excitation current controller 48, which is connected to the electrical line 46, and has a second excitation current controller 49, which is connected to the electrical line 47.

Analogous to the embodiment of the valve seat 39 of the second valve 6 for example identically to the valve seat 29 of the first valve 5, the excitation coil 42 of the second valve 6 is embodied identically to the excitation coil 31 of the first valve 5. The same is true for the armature 43 with regard to magnetic properties.

Mode of Operation of the Hydraulic Motor Vehicle Power Brake System 2

The control device 11 receives a signal from the pump pressure sensor 16 and as a result, recognizes whether the hydraulic accumulator 14 is sufficiently filled or whether it should be filled by switching on the electromotor 23 and therefore driving the pump 12. In the example, it does not intrinsically matter whether the pump pressure sensor 16 is embodied simply as a pressure switch comparable to the one in DE 19 61 039 A1 or whether the pump pressure sensor 16 sends a signal proportional to the pressure generated by the pump 12, which signal can correspondingly proportional p underlying a proportional power supply of the electromotor 13.

If the brake pedal 10 is not being actuated, then the wheel brake set-point transmitter 9 is set to "brake pressure zero" and the control device 11 produces the "excitation current intensity zero" in the excitation current controllers 48 and 49. Accordingly, the second valve 6 is disposed in the open position shown and the first valve 5 is in the closed position shown. The open position of the second valve 6 leads to the fact that the at least one wheel brake 7 communicates with the return line 44 and is therefore pressureless. In contrast, the closing spring 30 of the first valve 5 loads the closing body 29 indirectly via the armature 31 and inside the valve seat 28, the closing body is subjected on the one hand to the pressure of the external energy source 3 and on the other hand, is subjected to a resultant axial component of an opposing force possibly produced by the valve seat 28. If the pressure in the hydraulic accumulator 14 threatens to rise in an impermissible manner, either as the result of an inadequate function of the pump pressure sensor 16 or the control device 11 or due to the heating of the hydraulic accumulator 14 when the pump 12 is inactive, then an axial force pressing on the closing body 29 due to the cross section of the valve seat 28 as a function of the existing pressure prevails over the force of the spring 30, which is embodied according to the invention as a safety spring, resulting in the fact that due to the lifting of the closing body 29 from the valve seat 28, pressure fluid flows through the inlet opening 26 and the outlet opening 27 of the first valve 5 and finally discharges into the pressure free reservoir 15 through the open second valve 6 and the return line 44. In this respect, it is clear that the embodiment of the first valve 5 according to the invention, at least when the brake pedal 10 is not being actuated, permits the elimination of an otherwise standard separately installed safety valve.

If the actuation of the brake pedal adjusts the wheel brake pressure set-point transmitter 9 so that the control device 11 receives a brake pressure set point that can be arbitrarily set by the driver, but the wheel brake pressure "zero" is still sent by means of the wheel brake pressure sensor 8, then the control device 11 controls the second excitation current controller 49 in such a way that due to the resultant excitation current flowing through the electrical line 47, the excitation coil 42 produces a magnetic field and as a result, presses the armature 43 counter to the force of the opening spring 41 in the closing body 40 onto the valve seat 39 of the second valve 6. Furthermore, the control device 11 also controls the first excitation current controller 48 so that the excitation coil 31 produces a magnetic field that acts on the armature 32 so that it compensates for at least part of the closing force of the closing spring 30. This has the desired result that only a part of the closing force of the closing spring 30 is available for pressing the closing body 29 against the valve seat 28 and/or as a force counter to a hydraulic load with the force of the external energy source 3 multiplied by the cross section of the valve seat 28. The excitation of the excitation coil 31 therefore at least temporarily produces an imbalance of force which leads to the departure of the closing body 29 from the valve seat 28 and as a result leads to a flow of pressure fluid through the pressure line 24, the inlet opening 26, the housing 25, the outlet opening, 27, and the wheel brake line 33 into the at least one wheel brake 7, with the result that in the at least one wheel brake 7, a wheel brake pressure increase is produced and as a result, an initially existing pressure difference between the inlet opening 26 and the outlet opening 27 of the first valve 5 becomes smaller until finally, due to the resultant downstream hydraulic impingement of the closing body, the closing spring 30 is in a position to seal the valve seat 28 by means of the closing body 29. The increased pressure leading up to the sealing in the wheel brake 7 also acts by means of the sensor line 34 in the wheel brake pressure sensor 8, which sends an actual signal to the control device 11, which signal is associated with the wheel brake pressure sensed. In a manner that will be described later in conjunction with FIG. 3, the control device 11 is embodied in such a way that it increases a possibly insufficiently increased wheel brake pressure actual value by means of intensified control of the first excitation current controller 48. The control device 11 is also equipped in such a way that in association with the wheel brake pressure set point chosen by the driver, the second excitation current controller 49 supplies an excitation current to the excitation coil 42, which current maintains a wheel brake pressure in this wheel brake 7 that corresponds to at least the magnitude of the wheel brake pressure set point.

It is clear that when the second valve 6 is closed in a sufficiently firm manner, a wheel brake pressure increases more sharply the more intensely the excitation current coming from the first excitation current controller 48 is adjusted. However, it is also clear that for a high wheel brake pressure, the second valve 6 must be kept closed by means of a greater excitation current from the second excitation current controller 49 than when there is a relatively low wheel brake pressure.

If the driver arbitrarily uses the brake pedal 10 to adjust the brake pressure set-point transmitter 9 to a lower brake pressure set point, then the control device 11 recognizes that the brake pressure actual value that is sent from the brake pressure sensor 8 to the control device 11 is higher. Therefore by a weakened control of the second excitation current controller 49, the control device 11 reduces the closing force in the second valve 6 so that the second valve 6 can be used to discharge pressure fluid from the wheel brake 7 to the reservoir 15. At the same time, the control device 11 also acts on the first excitation current controller 48 to a weakened degree so that a pressure difference that possibly exists between the inlet opening 26 and the outlet opening 27 of the first valve 5 can become greater. If the driver arbitrarily allows the brake pedal 10 to return to its initial position, then the wheel brake pressure set-point transmitter 9 sends the "wheel brake pressure zero" to the control device 11 so that this control device acts on both excitation current controllers 48 and 49 in such a way that they no longer emit excitation current. This brings the apparatus back to the state from which the function description began.

An exemplary embodiment of the control device 11 is described below in conjunction with FIG. 3.

The control device 11 has a first input 50, a second input 51, and a third input 52. The first input 50 is connected to the wheel brake pressure sensor 8. The second input 51 is connected to the wheel brake pressure set-point transmitter 9. The control device 11 has a fourth input 53 for the power supply.

For example, the first input 50 is connected to a first input 54 of a comparator 55. This comparator 55 has a second input 56 as well as an output 57 and is for example embodied in a manner associated with the prior art and therefore need not be described in detail. An adaptor unit 58 is connected to the second input 51 of the control device 11 and is electrically connected to the second input 56 of the comparator 55. In the example, the comparator 55 is equipped to process actual signals coming from the wheel brake pressure sensor 8. As a result of the disposition of the adaptor unit 58, depending on how the wheel brake pressure set-point transmitter 9 is embodied, signals sent from the wheel brake pressure set-point transmitter 9 can be adapted to the order of magnitude, for example to the level of signals that can be sent from the wheel brake pressure sensor 8 and/or to the type of signal that the wheel brake pressure set-point transmitter 8 can deliver. In other words, voltages, for example, which are proportional to a wheel brake pressure supplied to the wheel brake pressure sensor 8, can be delivered to the input 50 of the control device 11. In contrast to this, the wheel brake pressure set-point transmitter 9, for example, can be embodied in accordance with the prior art for the purpose of sending digitally-coded brake pressure set points. In one such instance, the adaptor unit 58 is embodied as a digital-analog converter so that at both inputs 54 and 56, the comparator 55 receives analog signals with levels that are modulated to each other.

If the signal magnitudes at the first input 54 and the second input 56 differ from each other, then the difference appears at the output 57.

A differentiator 59 is connected directly to the wheel brake pressure set-point transmitter 9 or, as shown in FIG. 3, is connected to the adaptor unit 58 on the output end. In the adaptation to analog signals, for example, which are sent by the adaptor unit 58, the differentiator is an analog differentiator whose essential element is a capacitor, not shown, and a measurement circuit, not shown. This measurement circuit is embodied, for example, so that it carries a signal "brake pressure increase" at an output 61 when there are analog signals of increasing size coming from the adaptor unit 58, which signals lead to a charging of the capacitor. Conversely, the measurement circuit is equipped in such a way that with "reduce brake pressure", a signal is sent from an output 60 of the differentiator 59. This signal from the output 60 is supplied to a first regulator 62 that is connected to the first excitation current controller 48. A signal "increase brake pressure" from the output 61 is supplied to a second regulator 63 that is connected to the second excitation current controller 49. The signals coming from the outputs 60 and 61 are used for converting the two regulators 62 and 63 respectively from a first controlling characteristic curve to a second controlling characteristic curve. A signal from the pump pressure sensor 16 is supplied by means of the input 52, for example as an additional variable that acts on the regulators 62 and 63.

The fourth input 53 of the control device 11 is connected, for example, to a battery 64 of a motor vehicle. Because it is known that batteries 64 of the kind in question do not emit constantly high voltages, particularly when under different loads, a regulated voltage converter 65 is connected to the fourth input 53, which can be inferred from the prior art and therefore does not need to be described. The voltage converter 65 supplies power to at least the two regulators 62 and 63 and, in a manner not shown, also powers the excitation current controllers 48 and 49, for example, which are embodied, for example, in the form of controllable current regulators.

In the control device 11, a pump control device or pump regulator device 66 is connected to the third input 52 and consequently to the pump pressure sensor 16. The pump control device 66 is used for controlling a motor current controller 67 in such a way that it supplies the electromotor 13 with current by means of the line 45 in order to drive the pump 12, so that this pump charges the hydraulic accumulator 14 by means of the line 21. It cannot be prevented that when the hydraulic accumulator 14 is being charged, a pressure change occurs in the line 21 and therefore also in the inlet opening 26 of the first valve 5. This is the reason why the pump pressure sensor 16, as described above, can be connected to the two regulators 62 and 63. The two regulators 62 and 63 are then equipped in a manner not shown so that they recognize pressure progressions sent by the pump pressure sensor 16 as pressure fluctuations and take them into account when carrying out the regulation. This is therefore advantageous because in order to achieve a wheel brake pressure desired by the driver, the lower the external energy pressure that is generated by the pump 13 or is currently present in the hydraulic accumulator 14, the more intense an excitation current must be supplied by the excitation current controller 48 to the first valve 5.

It has already been mentioned that the two regulators 62 and 63 can be embodied in a manner that is intrinsically arbitrary. In the event that the analog comparator 55 described is used, the two regulators 62 and 63 are preferably embodied as analog regulators. However, it is also possible to use a digital comparator in lieu of an analog comparator 55, or a computer, not shown, inside the control device 11, using software stored in the computer to compare input variables of set points and actual value to one another by computation and to digitally supply the deviations to the regulators 62 and 63. The regulators 62 and 63 themselves are in this instance also represented by means of a computer and are operated using software stored in the computer. A continuous-time regulation or a time-discrete regulation can take place depending on a selected structure and the technical embodiment of the computer.

Regardless of which type it is embodied as, the first regulator 62 has a first regulating characteristic curve, which is used to increase brake pressure and a second characteristic curve that is effective during brake pressure reduction. The second regulator 63 also has a first characteristic curve and a second regulating characteristic curve, but in this instance, the first curve is effective during a brake pressure decrease and the second curve is accordingly effective during a brake pressure increase.

Mode of Operation of the Control Device 11

When the brake pedal 10 is released, the comparator 55 receives signals of the same intensity at both inputs 54 and 56, which signals correspond, for example, to the brake pressure value "zero". Accordingly, no difference signal is apparent at the output 57. When the brake pedal 10 is released, no set-point change occurs so that no control signals are apparent at the outputs 60 and 61 of the differentiator 59. Independent of this and as a function of a signal that originates from the pump pressure sensor 16, which signal depends on whether the pump pressure lies above or below a predetermined pressure, the pump control device 66, by means of the motor current controller 67, makes sure that a current is supplied to the electromotor 13 so that the electromotor 13 drives the pump 12 in order to increase an insufficient pump pressure to the desired measure.

If the brake pedal 10 is actuated by a driver, then the wheel brake pressure set-point transmitter 9 sends this set point to the adaptor unit 58. In the manner described above, the adaptor unit 58 correspondingly sends a signal, which is associated with the set point, to the second input 56 of the comparator 55. Because for the time being no wheel brake pressure is present in the at least one wheel brake 7, there will also correspondingly be an actual value at the first input 54 of the comparator 55, which actual value is insufficient in relation to the set point, which results in the fact that the comparator 55 sends the deviation to the first regulator 62 and the second regulator 63 by means of the output 57 in a manner mentioned above. The switching of the second regulator 63 over to the second regulating characteristic curve also goes along with the production and increase of a wheel brake pressure set point 9.

The first regulator 62 is equipped in such a way that by using its first characteristic curve, it uses the initial variable, which corresponds to the given difference, as a signal for increasing brake pressure up to the wheel brake pressure set point. The regulator 62 is therefore set to a higher excitation current at the first excitation current controller 48, the higher the wheel brake pressure set point is chosen by the driver. The wheel brake pressure sensor 8 sends the controller result, which is detected by the wheel brake pressure sensor 8, to the first input 54 of the comparator 55. Accordingly, a difference signal that was initially present at the output 57 becomes smaller and the regulator 62 ends the adjustment of the first excitation current controller 48 and maintains the adjustment achieved.

At the same time, the second regulator 63 is operated with its second characteristic curve. The second characteristic curve of the second regulator 63 is characterized in that with an "increase brake pressure" tendency display coming from the output 61 of the differentiator 59, this regulator 63 controls the second excitation current controller 49 in such a way that for a particular wheel brake pressure, this second excitation current controller 49 carries a superelevated excitation current to the second valve 6. As a result, the second valve 6 is prevented from opening in an undesirable manner when the brake pressure increases and partial quantities of pressure fluid, which should flow through the first valve 5 in the direction of at least one wheel brake 7 to increase brake pressure, are prevented from flowing into the reservoir 15 and not into this wheel brake 7. It is also once more clear in this connection that the assurance against undesirable discharge of pressure fluid from the external energy source 3 is more reliably prevented the more forcefully the second valve 6 is held closed by means of excitation current from the second excitation current controller 49. Here too, though, the second valve 6 should not be held closed too strongly, because otherwise when the pump 12 supplies excess pressure fluid, an undesirable wheel brake pressure increase occurs, which results in an increased brake function, which the driver can in fact compensate for by partially releasing the brake pedal 10, but has the potential to be very disadvantageous when the roadway is icy. The second regulator 63 in this instance is also equipped in such a way that an excess of closing force in the second valve 6 is not too great. This kind of excess closing force can also be eliminated more rapidly when, by means of its output 57, the comparator 55 sends the regulating deviation "wheel brake pressure too high" to the second regulator 63.

The respective difference between an excitation current intensity when increasing to a particular wheel brake pressure or when de creasing to a particular wheel brake pressure can therefore be selected, for example, in the form of an essentially constant difference magnitude or in the form of a pre-selected factor so that at higher brake pressures, greater differences in the excitation currents can also result. The latter can be advantageous if the disturbance variables mentioned are relatively great. It is relatively insignificant that at low wheel brake pressures, pressure fluid, which is intrinsically unused, is possibly discharged from the external energy source 3 to the reservoir 15, because only a part of the pump capacity and the "normal pressure" projected for the external energy source 3 is required to produce low wheel brake pressures.

Figure 4:
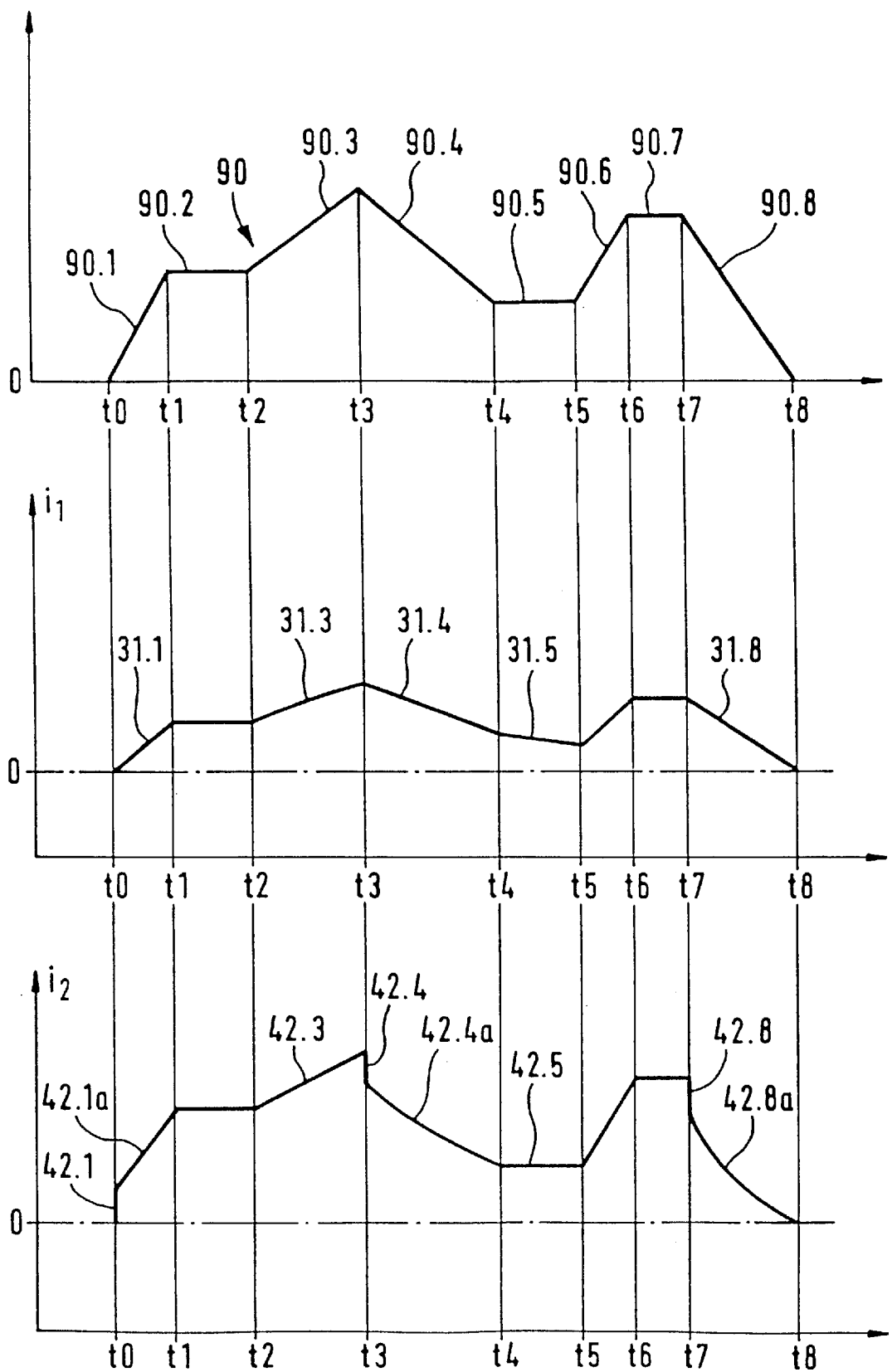
FIG. 4 shows an exemplary wheel brake pressure progression during a period of time and excitation currents that are associated with it and pertain to a first and second valve of the hydraulic motor vehicle power brake system according to FIG. 1.

In the top third, FIG. 4 shows an arbitrary example for a wheel brake pressure progression over time. Since this progression is a result of actuating the brake pedal 10 and therefore adjusting the wheel brake pressure set-point transmitter 9, the progression is labeled 90. The progression 90 begins sometime when the wheel brake pressure is "zero" and ends in the example at time t8, likewise when the wheel brake pressure is "zero". A first current increase 90.1 is affiliated with a first electrical current increase 31.1 for the excitation coil 31, which increase is shown in the middle third of FIG. 4. In association with the current increase 31.1 controlled by the first regulator 62, the second regulator 63 first generates a current jump 42.1, which is for example adjoined by a current increase 42.1a for the excitation coil 42 of the second valve, which increase is steeper in comparison to the current increase 31.1. In this instance, therefore, use is made of both previously mentioned possibilities of superelevating the closing force of the second valve 6 when producing a brake pressure increase. In the top third of FIG. 4, the brake pressure increase 90.1 is adjoined by a wheel brake pressure retention phase, which is indicated by a horizontal line 90.2. This permits no change to the current intensities which brought about the first brake pressure increase. A second pressure increase 90.3 adjoins this, which requires another current increase 31.3 according to the middle third of FIG. 4. A current increase that is labeled 42.3 is also required in the excitation coil 42 of the second valve 6. The second brake pressure increase 90.3 also adjoins a first partial brake pressure decreasing process 90.4. So that this can take place, an excess of closing force in the second valve 6 must be eliminated, which is represented by a very steep current drop 42.4, i.e. a negative current jump, and an essentially steady reduction in excitation current intensity 42.4a adjoining this. During this process, there should be an excess of closing force in the first valve 5, wherein this excess of closing force is indicated in the middle third of FIG. 4 by the relatively slightly inclined excitation current progression 31.4. This partial brake pressure reduction is adjoined by a brake pressure retention phase, which is represented by a constant current by means of a straight line 42.5 between the times t4 and t5. Since during this kind of pressure retention phase, it can be expected that the pump 12 supplies an excess of pressure fluid, it is desirable that this pressure fluid excess reaches the reservoir 15 without significant pressure change in the external energy source 3. To this end, the excitation current for the excitation coil 31 can be reduced somewhat between the times t4 and t5, which is characterized in the middle third of FIG. 4 by a slightly inclined straight line 31.5 between the times t4 and t5. Starting at the time t5, a subsequent third brake pressure increase 90.6 can in principle be produced in the same manner as the second brake pressure increase 90.3 since a brake pressure retention phase is the starting point in both instances. A third brake pressure retention phase 90.7 that adjoins this does not have to be described because here too, there is a transition from an increase phase into a retention phase in the same way that this occurred at the transition of the first brake pressure increase 90.1 into the first brake pressure retention phase 90.2. A subsequent wheel brake pressure reduction 90.8 to the value zero presupposes a complete closing of the first valve 5 and accordingly, an excitation current progression 31.8 to the reference value "zero". So that a first opening procedure of the second valve 6 can take place in the presence of the wheel brake pressure prevailing at the beginning of the brake pressure decreasing procedure, a jump-like initial current decrease 90.8 occurs, which is adjoined by an inclined current decrease 42.8a down to the value zero.

As already mentioned in the introduction to the specification and as has already been disclosed by U.S. Pat. No. 3,802,745, with regard to braked vehicle wheels in which the danger of wheel locking occurs to different degrees, in order to be able to be able to automatically brake the individual vehicle wheels in a manner that depends on the conditions, for example for four vehicle wheels, four first valves 5, 5.1, 5.2, 5.3 and four second valves 6, 6.1, 6.2, and 6.3 can be provided for four wheel brakes 7, 7.1, 7.2, and 7.3. For this, a vehicle wheel, not shown, to be braked by the wheel brake 7 is associated with a wheel rotation sensor 70 and is electrically connected to the control device 11.1 that has been modified for automatic brake slip regulation. Because this modification is carried out based on the prior art, three wheel brakes 7.1, 7.2, and 7.3 of the other vehicle wheels are associated with three other wheel rotation sensors 70.1, 70.2, 70.3.

Figure 2:
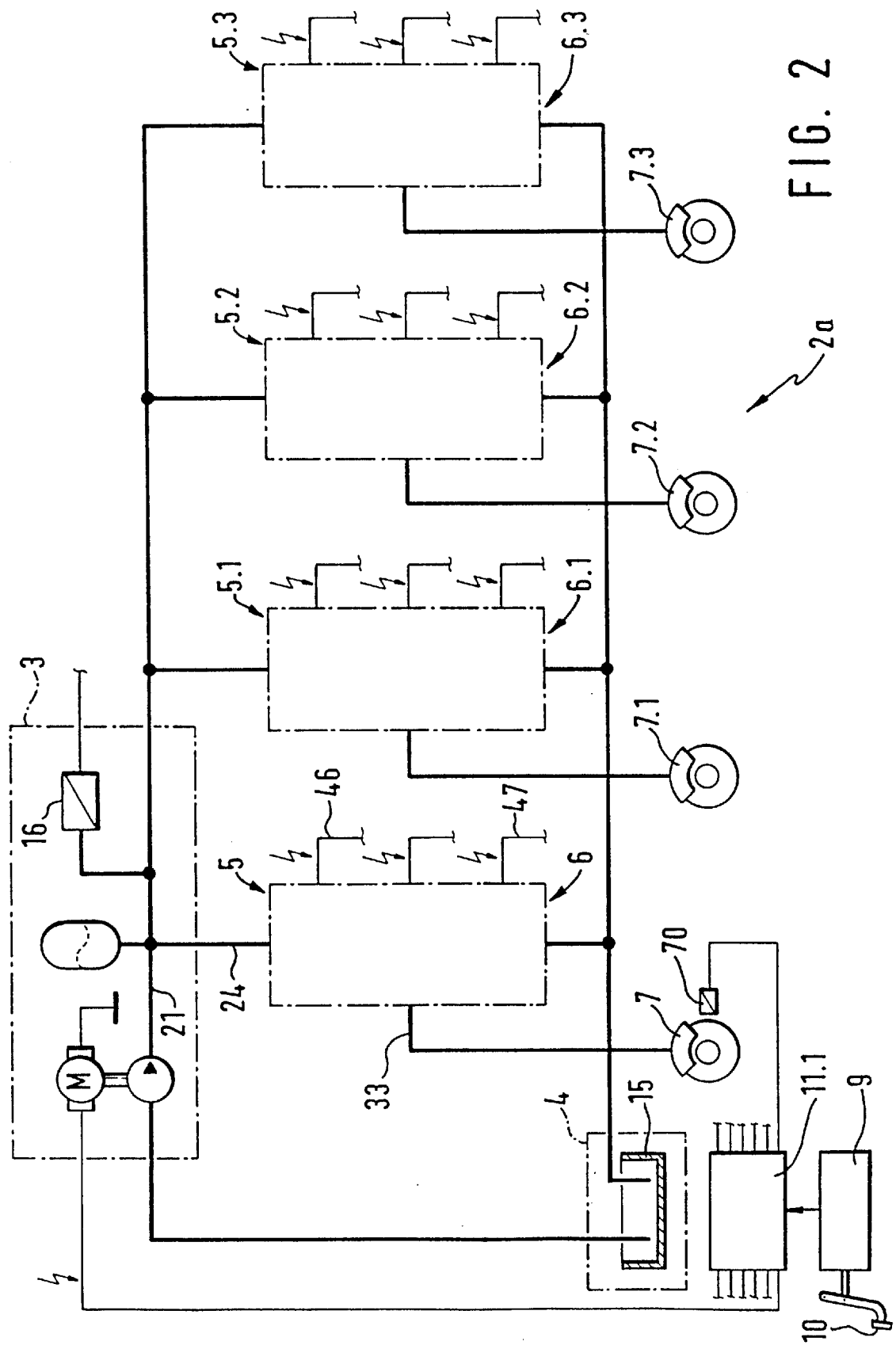
FIG. 2 shows the circuit diagram of a second exemplary embodiment of the motor vehicle power brake system according to the invention.

For the hydraulic motor vehicle brake system 2a shown in FIG. 2, which has the control device 11.1 that is modified to prevent the danger of wheel locking, preferably use is made of the regulating characteristic curve for the second regulator 63, which operates for jump-like increase of excitation current at the start of a braking and for a jump-like excitation current adaptation when a brake pressure reduction is initiated. This produces the advantage that when there are slight changes in brake pressure, which can occur, for example, in the antilock operation, and with the steady consumption of pressure fluid from the external energy source 3 required by this, an above-mentioned wasteful discharge of pressure fluid from the external energy source into the reservoir can be sufficiently prevented.

In the simplification already described above, which states that the valve seats 28 and 39 and also the excitation coils 31 and 42 are embodied as structurally equivalent and the electromagnetic properties of the armature 32 and 43 practically coincide, it can therefore be summarily established that during a brake pressure regulating operation, i.e. with the increase of wheel brake pressure by pressing down on the brake pedal 10 and with the decrease of wheel brake pressure by releasing the brake pedal 10, an excitation current of the excitation coil 31 of the first valve 5 can essentially be just the same as an excitation current for the second excitation coil 42 of the second valve 6. Deviations from this are produced by means of undesirably low pump pressure, whose disturbance variable Z1 is characterized in FIG. 3, and by means of the characteristic curves of the first regulator 62 when brake pressure decreases and of the second regulator 63 when brake pressure increases.

Up to this point, it has been assumed that the valve seats 28 and 39 are structurally equivalent. If a deviation from this structural equivalence occurs, naturally deviations also occur in such a manner that the valve seat that is embodied as larger requires greater closing forces and correspondingly, an associated excitation coil must be more powerful. For example, the larger valve seat can be associated with a second valve so that a wheel brake pressure that is already intrinsically low can be rapidly reduced, for example when driving on an icy roadway. In a case like this, therefore, the first respective valve has the narrower valve seat, which does not have to be disadvantageous because rapid wheel brake pressure increases can be generated through a narrow valve seat as well, by means of the relatively high pressure of the external energy source 3, and because excessively rapid wheel brake pressure increases impair the antilock operation.

The foregoing relates to preferred exemplary embodiments of the invention, it being understood that other variants and embodiments thereof are possible within the spirit and scope of the invention, the latter being defined by the appended claims.

We claim:

1. A hydraulic motor vehicle power brake system comprising a reservoir for hydraulic pressure fluid, an external energy source that is supplied from the reservoir, said external energy source includes a pump driven by a motor and at least one means for limiting the pressure of the pump, at least one valve device disposed between the external energy source and at least one wheel brake as well as the reservoir, said valve device is electrically controlled and has at least one spring and is for separating the wheel brake from the reservoir and for connecting the wheel brake to the external energy source, a wheel brake pressure sensor associated with the wheel brake, a brake pedal and an electrical set-point transmitter that is adjusted by means of said pedal and is for selecting a wheel brake pressure, a control device connected to the set-point transmitter and the wheel brake pressure sensor, said control device is equipped for comparing signals from the set-point transmitter and the wheel brake pressure sensor and for electrically controlling the valve device as a function of a comparison result, a first and second valve device (5, 6) embodied in accordance with a seat valve construction, said first valve device has a valve seat (28) connected to the external energy source (3) and a closing body (29) that is pressed against the valve seat (28) by the spring (30), the spring (30) is dimensioned as a safety valve spring, the first valve device (5) has at least one electromagnet (31, 32) which counteracts a force of the spring (30) when an excitation current is supplied by the control device (11, 48), and that the control device (11) has an excitation current controller (48) which is connected to the electromagnet (31, 32).

2. A hydraulic motor vehicle power brake system according to claim 1, in which the second valve device (6) has a second valve seat (39) connected to the wheel brake (7) and associated with said wheel brake, said second valve device has a second closing body (40) as well as a second electromagnet (42, 43), which is associated with the second closing body (40) and is for loading the second closing body (40) in the closing direction in opposition to possibly existing wheel brake pressure, and that the control device (11) has a second excitation current controller (49) and is modified for controlling the second excitation current controller (49) to adjust wheel brake pressure at least during a wheel brake pressure decreasing procedure.

3. A hydraulic motor vehicle power brake system according to claim 2, in which the valve seat (28) of the first valve (5) and the valve seat (31) of the second valve (6) are essentially embodied as structurally equivalent and that the control device (11) is equipped to control the excitation current of the second electromagnet (42, 43) at least in a manner that directionally depends on the first excitation current, in such a way that during a braking operation, both excitation currents have essentially the same intensity.

4. A hydraulic motor vehicle power brake system according to claim 3, in which the hydraulic motor vehicle brake system (2a) has at least one additional valve device (5.1, 5.2, 5.3, 6.1, 6.2, 6.3) and at least one first additional excitation current controller (48) and at least one additional second excitation current controller (49).

5. A hydraulic motor vehicle power brake system according to claim 3, in which the wheel brake pressure set-point transmitter (9) and the at least one wheel brake pressure sensor (8) are connected to a comparator (55) that has an output (57), that the output (57) of the comparator (55) is connected to a first regulator (62) that acts on the first excitation current controller (48) and a second regulator (63) that acts on the second excitation current controller (49), wherein the first regulator (62) is equipped in such a way that when a set point is changed, it emits a greater excitation current when there is a brake pressure decrease than when there is a brake pressure increase, and wherein the second regulator (63) is equipped in such a way that when there is a brake pressure increase during a brake pressure decrease, the second regulator (63) eliminates an excess closing force in the second valve (6).

6. A hydraulic motor vehicle power brake system according to claim 5, in which the wheel brake pressure set-point transmitter (9) is connected to a differentiator (59) which, based on a change of a signal coming from the wheel brake pressure set-point transmitter (9), indicates "brake pressure increase" or "brake pressure decrease" on at least one output (60, 61), in order to switch the first regulator (62) and the second regulator (63) over to controlling the excitation current controllers (48, 49) for brake pressure increases or brake pressure decreases.

7. A hydraulic motor vehicle power brake system according to claim 2, in which the hydraulic motor vehicle brake system (2a) has at least one additional valve device (5.1, 5.2, 5.3, 6.1, 6.2, 6.3) and at least one first additional excitation current controller (48) and at least one additional second excitation current controller (49).

8. A hydraulic motor vehicle power brake system according to claim 2, in which the wheel brake pressure set-point transmitter (9) and the at least one wheel brake pressure sensor (8) are connected to a comparator (55) that has an output (57), that the output (57) of the comparator (55) is connected to a first regulator (62) that acts on the first excitation current controller (48) and a second regulator (63) that acts on the second excitation current controller (49), wherein the first regulator (62) is equipped in such a way that when a set point is changed, it emits a greater excitation current when there is a brake pressure decrease than when there is a brake pressure increase, and wherein the second regulator (63) is equipped in such a way that when there is a brake pressure increase during a brake pressure decrease, the second regulator (63) eliminates an excess closing force in the second valve (6).

9. A hydraulic motor vehicle power brake system according to claim 8, in which the wheel brake pressure set-point transmitter (9) is connected to a differentiator (59) which, based on a change of a signal coming from the wheel brake pressure set-point transmitter (9), indicates "brake pressure increase" or "brake pressure decrease" on at least one output (60, 61), in order to switch the first regulator (62) and the second regulator (63) over to controlling the excitation current controllers (48, 49) for brake pressure increases or brake pressure decreases.

10. A hydraulic motor vehicle power brake system according to claim 1, in which the hydraulic motor vehicle brake system (2a) has at least one additional valve device (5.1, 5.2, 5.3, 6.1, 6.2, 6.3) and at least one first additional excitation current controller (48) and at least one additional second excitation current controller (49).

11. A hydraulic motor vehicle power brake system according to claim 10, in which the wheel brake pressure set-point transmitter (9) and the at least one wheel brake pressure sensor (8) are connected to a comparator (55) that has an output (57), that the output (57) of the comparator (55) is connected to a first regulator (62) that acts on the first excitation current controller (48) and a second regulator (63) that acts on the second excitation current controller (49), wherein the first regulator (62) is equipped in such a way that when a set point is changed, it emits a greater excitation current when there is a brake pressure decrease than when there is a brake pressure increase, and wherein the second regulator (63) is equipped in such a way that when there is a brake pressure increase during a brake pressure decrease, the second regulator (63) eliminates an excess closing force in the second valve (6).

12. A hydraulic motor vehicle power brake system according to claim 11, in which the wheel brake pressure set-point transmitter (9) is connected to a differentiator (59) which, based on a change of a signal coming from the wheel brake pressure set-point transmitter (9), indicates "brake pressure increase" or "brake pressure decrease" on at least one output (60, 61), in order to switch the first regulator (62) and the second regulator (63) over to controlling the excitation current controllers (48, 49) for brake pressure increases or brake pressure decreases.

* * * * *